US009439268B2

(12) United States Patent
Walma, Jr.

(10) Patent No.: US 9,439,268 B2
(45) Date of Patent: Sep. 6, 2016

(54) SYSTEM AND METHOD FOR AUTO-COMMISSIONING BASED ON SMART SENSORS

(71) Applicant: Kenneth Dale Walma, Jr., Peachtree City, GA (US)

(72) Inventor: Kenneth Dale Walma, Jr., Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 41 days.

(21) Appl. No.: 14/486,846

(22) Filed: Sep. 15, 2014

(65) Prior Publication Data

US 2015/0076992 A1    Mar. 19, 2015

Related U.S. Application Data

(60) Provisional application No. 61/877,551, filed on Sep. 13, 2013.

(51) Int. Cl.
*H05B 37/02* (2006.01)
*H05B 33/08* (2006.01)

(52) U.S. Cl.
CPC ...... *H05B 37/0218* (2013.01); *H05B 37/0227* (2013.01); *H05B 37/0245* (2013.01); *H05B 33/0815* (2013.01); *Y02B 20/46* (2013.01); *Y02B 20/48* (2013.01)

(58) Field of Classification Search
USPC ............. 315/149–159, 291, 307–326, 185 S, 315/224, 225, 209 R
See application file for complete search history.

(56) References Cited

U.S. PATENT DOCUMENTS

| 4,236,101 A | 11/1980 | Luchaco |
| 6,340,864 B1 | 1/2002 | Wacyk |
| 7,566,137 B2 | 7/2009 | Veskovic |
| 2011/0178650 A1 | 7/2011 | Picco |
| 2012/0206050 A1 | 8/2012 | Spero |
| 2015/0076989 A1* | 3/2015 | Walma ................... H04B 10/40 315/149 |

OTHER PUBLICATIONS

International Search Report for PCT/US2014/055676, mailed Dec. 25, 2014.

* cited by examiner

*Primary Examiner* — Tuyet Vo
(74) *Attorney, Agent, or Firm* — King & Spalding LLP

(57) ABSTRACT

An imaging sensor determines an influence of artificial light from one or more artificial light sources and an influence of natural light in an area associated with a lighting system. On the basis of the influence of the natural light and the influence of the artificial light, the imaging sensor determines the location of the one or more artificial light sources with respect to the location of the imaging sensor. Further, the imaging sensor allocates a portion of the area as an area of influence of the imaging sensor based on a threshold change in luminescence of the area associated with switching on or switching off of the one or more artificial light sources. Responsively, the imaging sensor associates at least one artificial light source of the one or more light sources and occupancy sensors corresponding to the at least one artificial light source with the allocated area of influence.

20 Claims, 4 Drawing Sheets

SYSTEM AND METHOD FOR AUTO-COMMISSIONING BASED ON SMART SENSORS

CROSS REFERENCE TO RELATED APPLICATIONS

This application claims priority to U.S. Provisional Patent Application No. 61/877,551, filed on Sep. 13, 2013, and entitled "System and Method for Auto-Commissioning based on Smart Sensors," the entire content of this provisional patent application being incorporated herein by reference.

TECHNICAL FIELD

The present disclosure relates to an intelligent lighting system. Specifically, the present disclosure relates to a system and method of auto commissioning based on smart sensors.

BACKGROUND

Low cost microprocessors and electronics have enabled the increased granularity of control systems in lighting and energy management controls. Traditionally, while lighting systems have utilized a central panel with breaker or relay controls to switch or dim a circuit of lighting, today's systems are incorporating smart, solid state lighting fixtures, sensors, keypads, and a plethora of other devices. As systems have moved from a centralized control methodology, to an addressable topology, the number of devices in a system has increased dramatically. As many as 30,000 digital, addressable devices may be present in a building's lighting or energy management system.

In order to properly program these systems having numerous devices, a commissioning agent must first "address" these devices which may include associating a digital address to each of the devices and determining a physical location of each of the devices. In one example, this can be done via a visual/optical method, such as flashing an LED or another light source at the light fixture that identifies the device associated with the digital address and provides its location. In another example, this can also be completed by a physical method, such as pushing a button on the device that emits a signal or reading an RFID tag on the device, and accordingly associating the device with a location on a map of the floor. Once these devices are addressed and located, a control system design can then be implemented in order to instruct the devices to dynamically react to the buildings occupants in a certain manner. In all of these circumstances, said commissioning process can be time consuming and complicated. Thus, there is a need for a technology that addresses the above-mentioned deficiencies.

SUMMARY

The present disclosure can address the above-described needs by auto commissioning a lighting system using smart sensors. In one aspect, a method for auto commissioning a lighting system using smart sensors includes determining an influence of natural light and an influence of artificial light from one or more artificial light sources in an area using an imaging sensor. Further, the method includes determining a location of the artificial light source with respect to a location of the imaging sensor using the imaging sensor. The location of the artificial light source is determined based on the influence of the artificial light and the influence of the natural light. Furthermore, the method includes using the imaging sensor to allocate a portion of the area as an area of influence of the imaging sensor and associate at least one artificial light source from the one or more artificial light sources to the area of influence of the imaging sensor.

In another aspect, a system for auto commissioning a lighting system using smart sensors includes an imaging sensor that has a processor that is configured to determine an influence of natural light in an area. The processor of the imaging sensor further determines an influence of artificial light from one or more artificial light sources in the area. Then the processor of the imaging sensor determines a location of the artificial light source with respect to a location of the imaging sensor based on the influence of the artificial light and the influence of the natural light. In addition, the processor of the imaging sensor allocates a portion of the area as an area of influence of the imaging sensor. Responsive to allocating the portion of the area as the area of influence of the imaging sensor, the processor associates at least one artificial light source from the one or more artificial light sources with the area of influence of the imaging sensor. Further, the processor associates at least one occupancy sensor with at least one artificial light source that is associated with the area of influence of the imaging sensor.

In yet another aspect, an apparatus for auto commissioning a lighting system using smart sensors includes an imaging sensor and a processor coupled to the imaging sensor. The processor is configured to determine an influence of natural light and an influence of artificial light from one or more artificial light sources in an area. Then, the processor is configured to determine a location of the artificial light source with respect to a location of the imaging sensor based on the influence of the artificial light and the influence of the natural light. Further, the processor allocates a portion of the area as an area of influence of the imaging sensor and associates at least one artificial light source from the one or more artificial light sources with the area of influence of the imaging sensor.

These and other aspects, features, and embodiments of the present invention may be more clearly understood and appreciated from a review of the following detailed description of the disclosed embodiments and by reference to the drawings and claims.

BRIEF DESCRIPTION OF THE FIGURES

Example embodiments are illustrated by way of example and not limitation in the figures of accompanying drawings, in which.

Figure 1:
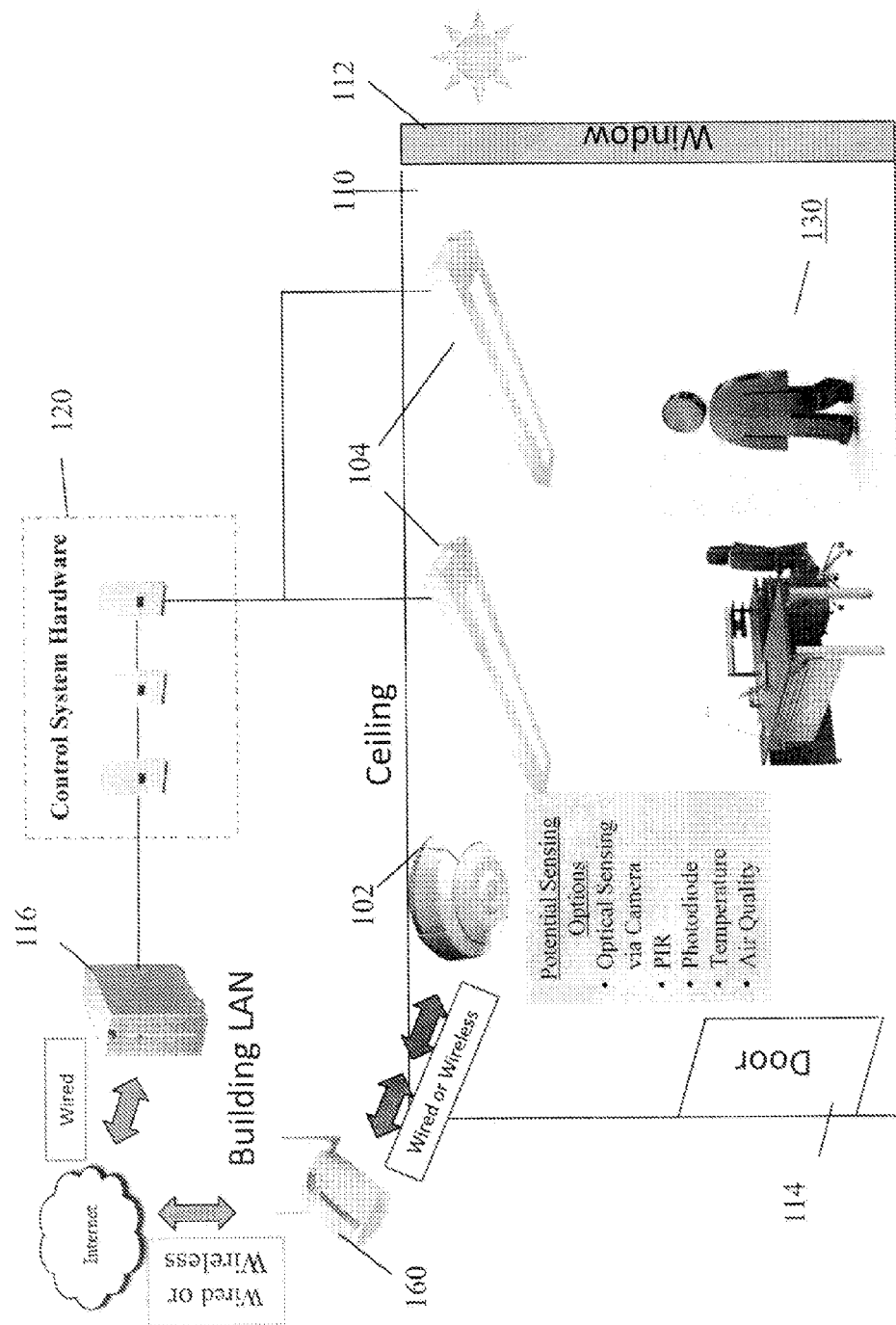
FIG. 1 illustrates an example operational environment of the system and method of auto commissioning based on smart sensors, according to certain example embodiments of the present disclosure.

Many aspects of the invention can be better understood with reference to the above drawings. The elements and features shown in the drawings are not to scale, emphasis instead being placed upon clearly illustrating the principles of example embodiments of the present invention. More-over, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DETAILED DESCRIPTION OF EXAMPLE EMBODIMENTS

Disclosed are a system, a method and an apparatus for auto-commissioning using smart sensors. Before discussing the embodiments directed to the method and system of auto-commissioning using smart sensors, it may assist the reader to understand the various terms used herein by way of a general description of the terms in the following paragraphs.

The term 'commissioning,' as used herein can include, but is not limited to, properly locating the daylight sensor in the room, setting the dimming curves, and addressing all of the components in the lighting control system, multi-level switching, occupancy/vacancy sensing, daylight harvesting, architectural dimming, personal tuning, lumen maintenance, and so on.

The term 'artificial light,' as used herein may generally refer to light from any appropriate artificial light source.

The term 'penetration of artificial light/natural light,' or 'influence of artificial light/natural light,' as used herein may generally refer to the extent to which light from an artificial light source or natural light source penetrates into the interior of a room. For example, the extent to which direct sunlight penetrates into the interior of a room through a window in a room or the extent to which light from an electric lamp spreads to different portions of a room.

The term 'area of influence of an imaging sensor,' or 'area of influence of an image sensor,' as used herein may generally refer to any area in the vicinity of the imaging/image sensor within which the imaging/image sensor can influence a change in luminescence above a threshold luminescence difference. For example, the area of influence associated with the imaging sensor may be a square or a circular area in the room surrounding the imaging sensor and within which the imaging sensor can influence a change in luminescence over 2 lumens via a light control system.

In the following description, for purposes of explanation, numerous specific details are set forth in order to provide a thorough understanding of the various embodiments of auto-commissioning using smart sensors. It will be appreciated that the various embodiments discussed herein need not necessarily belong to the same group of example embodiments, and may be grouped into various other embodiments not explicitly disclosed herein. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

A lighting system may have numerous light fixtures, wall controls, dimmers, and any other appropriate control devices that operate in concert to drive the lighting system. For example, a lighting system for a building may comprise thousands of light fixtures configured to hold lights sources and controllable by a wall switch to operate individually or in combination to illuminate a surrounding area. Each device in the lighting system, such as the lighting fixture, control device, dimmer, and so on, may be digitally addressable and accordingly associated with its respective digital address. The digital address of each device can be used to determine, locate, and/or program that device. Manually commissioning a lighting system having a large number of associated devices using commissioning agents may be highly labor intensive and cost intensive. Further, manual processes are prone to human errors. An automatic commissioning technology can addresses the deficiencies and shortcomings of a manual commissioning process.

An auto commissioning system and method may include a smart sensor. In one embodiment, the smart sensor may be an individual sensor, such as an image sensor, an optical camera, or any other sensor adapted with image based sensing technology. The image based sensing technology may be implemented using, inter alia, an image sensor, an optical sensor, a 3-D image capture camera, and/or a motion capture camera. In an example embodiment, in addition to the image based sensing technology, the smart sensor can be adapted to include other sensors such as, inter alia, PIR (Passive Infrared Sensor), photodiode, temperature, and air quality sensors. The smart sensor may also be implemented as a combination of one or more sensors that operate in concert. By using a smart sensor in combination with external data from weather, GPS, and or building specific data; the lighting fixtures and/or other devices can be controlled and adjusted to determine proper associations and locations of said devices which may eliminate the need for costly commissioning agents. In other words, as described above, using a plurality of sensing technologies, a lighting system can be systematically controlled to automatically locate, adjust, and associate lighting fixtures and devices.

Figure 2:
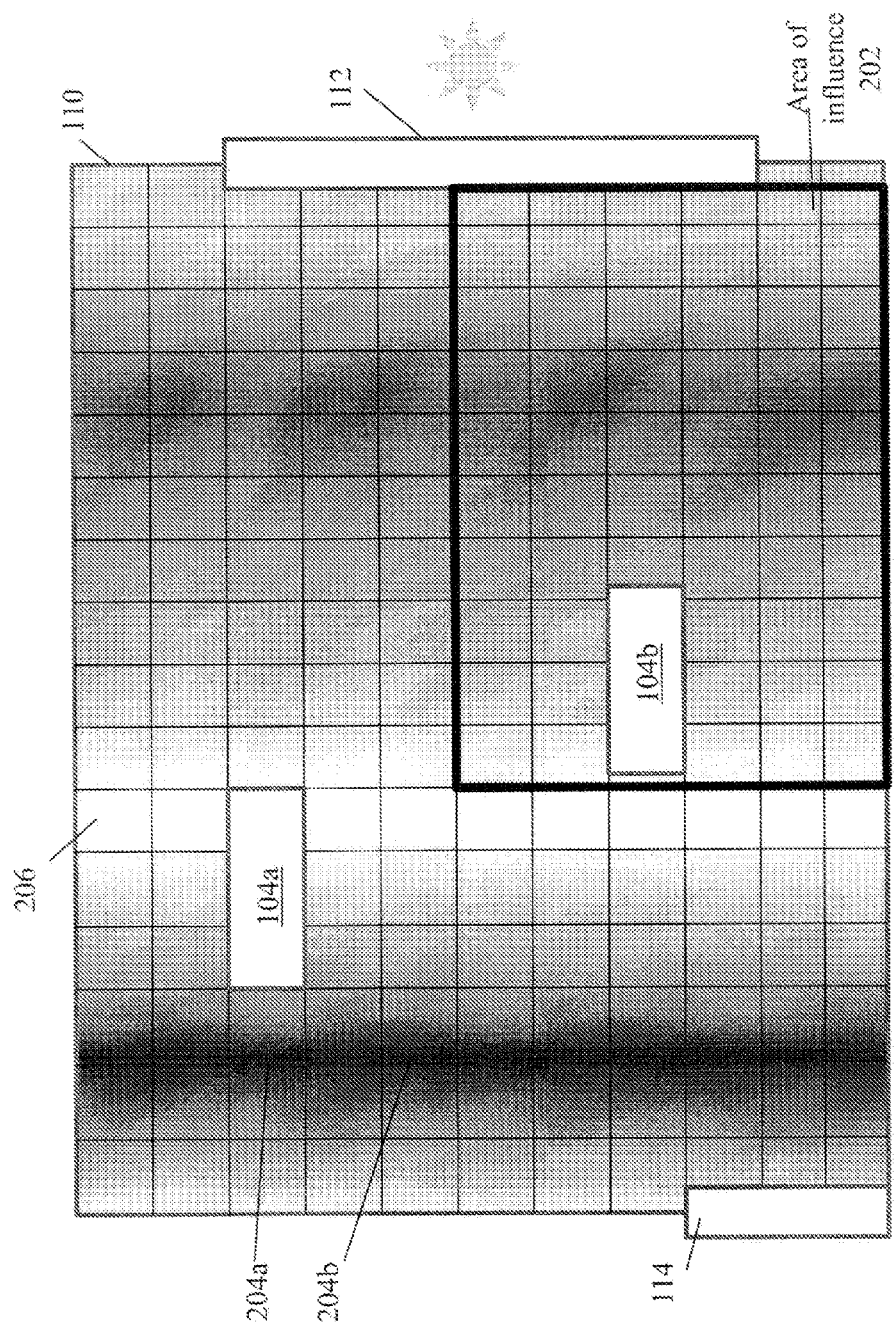
FIG. 2 illustrates an example luminescence map of a room as seen by an imaging sensor in the room, according to certain example embodiments of the present disclosure.
Figure 3A:
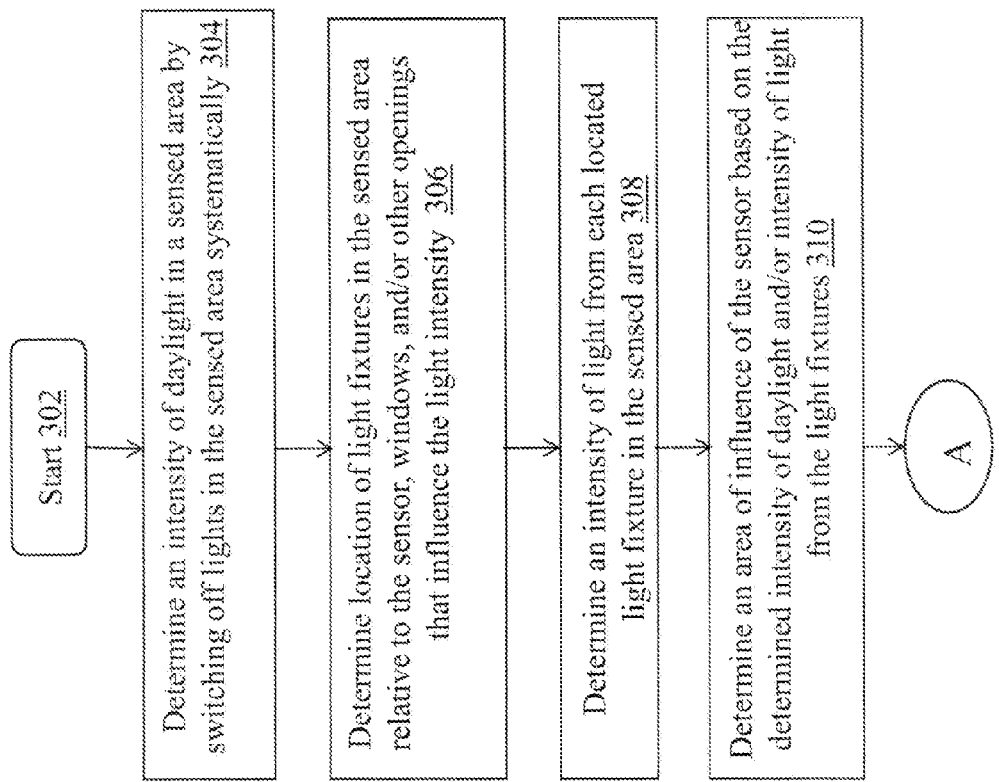
FIGS. 3A and 3B (collectively 'FIG. 3') illustrate a process flow diagram of a method of auto commissioning based on smart sensors, according to certain example embodiments of the present disclosure.
Figure 3B:
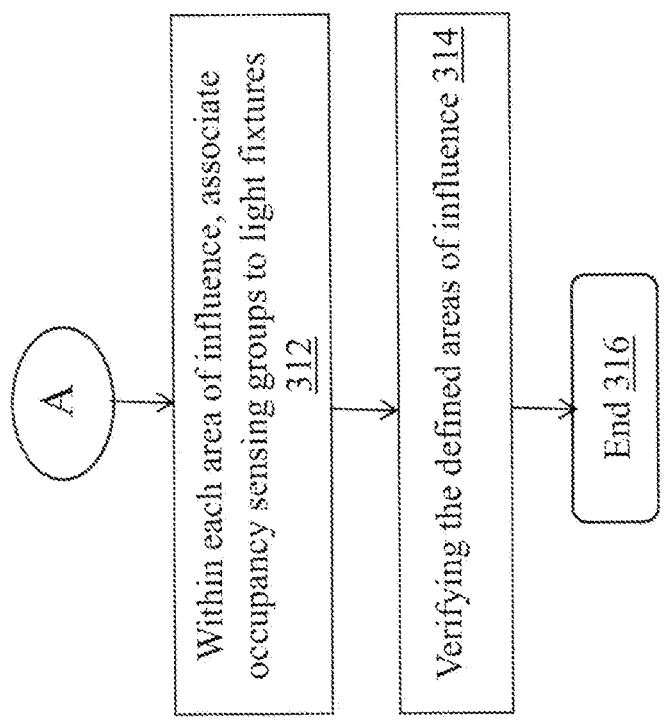

Technology for an auto-commissioning system based on smart sensors will now be described in greater detail with reference to FIGS. 1-3 which describe representative embodiments of the present invention. In the following description, for purposes of explanation, numerous specific details are set forth in order to provide a thorough understanding of the various embodiments. FIG. 1 describes an operational environment of an auto commissioning system based on smart sensors. FIG. 2 describes the operation of the smart sensors to commission the lighting system in greater detail. FIGS. 3A and 3B will be described by making references back to FIGS. 1-2. Specifically FIGS. 3A and 3B describe operations of the auto-commissioning system using suitable illustrations and flowcharts.

As described above, the present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "example embodiments" given herein are intended to be non-limiting and among others supported by representations of the present invention.

Turning to FIG. 1, this figure illustrates an example operational environment of the system and method of auto-commissioning based on smart sensors, according to certain example embodiments of the present disclosure. In particular, FIG. 1 illustrates a room 110, a window 112, a door 114, light fixtures 104, an imaging sensor 102, network infrastructure 160, a server 116, a lighting fixture control system 120 (herein 'control system'), and an occupant 130.

As illustrated in FIG. 1, in an example embodiment, a room 110 may include a window 112 and a door 114. One of ordinary skill in the art can understand and appreciate that the room 110 illustrated in FIG. 1 is only an example, and the room 110 can be replaced by any other architecture, such as other rooms, hallways, porches, etc. without departing from the broader scope of this description. In an example embodiment, the window 112 in the example room 110 may be facing the outdoors and may let natural light, such as sunlight, into the room 110. In some embodiments, the window 112 may be covered with blinds that are user or machine controllable to adjust an amount of natural light entering the room 110. In addition to receiving natural light through the window 112, the room 110 may receive artificial light from artificial light sources affixed to the light fixtures 104 implemented in the room 110. The light fixtures 104 either individually or in combination may light the room 110 along with the natural light from the window 112. In an example embodiment, the room 110 may additionally include control devices, such as wall switches, occupancy sensors, etc., to control an operation of the light fixtures 104.

Further, the room may include an imaging sensor 102. The imaging sensor 102 may be a camera, an infrared sensor, or a light sensing camera. In some example embodiments, the imaging sensor 102 may be used in combination with other sensors such as PIRs (Passive Infrared Sensor), photodiodes, temperature sensors, and/or air quality sensors. In one embodiment, the imaging sensor 102 may be affixed in the room 110, for example along with a light fixture and having a 360 degree view of the room 110. In another embodiment, the imaging sensor 102 may be coupled to any appropriate mobile computing device, such as a handheld device, or any appropriate stationary computing device present in the room.

The imaging sensor 102 may be configured to provide an automatic control of a ratio of natural light to artificial light. Such automatic control may maintain a desired illumination in the room 110 or in a desired portion of the room 110. In addition to providing automatic control of the ratio of natural light to artificial light in the room 110, the imaging sensor 102 may be configured to obtain optical images of the room 110 and generate a luminescence map of the room that defines a level of penetration of the natural light and the influence of the artificial light in various areas of the room 110. Further, the luminescence map and/or images of the room 110 as captured by the imaging sensor 102 may be transmitted to a centralized server 116 through a network over a wired and/or a wireless communication link.

The centralized server 116 that receives the luminescence map may also be configured to receive information that aids in generating and/or enhancing the luminescence map from additional sensors in the room 110, such as PIRs (Passive Infrared Sensor), photodiodes, temperature sensors, and/or air quality sensors. Further, the centralized server 116 may be configured to receive external data from weather, GPS, and/or building specific data. Furthermore, the centralized server 116 may be configured to receive inputs from control devices associated with the control of the artificial lights 104 and/or the blinds associated with the window 112. Responsive to receiving the luminescence map, data from additional sensors, control devices, and/or the external data, the centralized server 116 may be configured to use the data to determine a location of the light fixtures 104 respective to a location of the imaging sensor 102 and/or the additional sensors in the room 110. In addition to determining a location of the light fixtures 104, the centralized server 116 may be configured to determine a ratio of the natural light to artificial light in the room 110 based on the received data. Further, the centralized server 116 is configured to adjust the intensity of artificial light or the natural light by controlling the light fixtures 104 and/or the blinds associated with the window 112 in the room 110 via a control system 120. In one example embodiment, the centralized server 116 may control the artificial light in the room 110 by generating and transmitting appropriate control signals to the control devices responsible for controlling the light fixtures 104.

Further, the centralized server 116 may be configured to determine an area of influence associated with the imaging sensor 102. A luminescence within an area of influence can be controlled by the imaging sensor 102 by controlling the light fixture 104 and/or window blinds via the control system 120. In one embodiment, the imaging sensor 102 may include a processor. If the imaging sensor 102 has a processor, then all of the above-mentioned operations associated with the centralized server 116 may be performed within the imaging sensor 102 by the processor. The luminescence map and areas of influence may be described below in greater detail and using examples in association with FIG. 2.

Turning to FIG. 2, this figure illustrates an example luminescence map of a room as seen by an imaging sensor in the room, according to certain example embodiments of the present disclosure. In FIG. 2, the lines that form the grid are illustrated only to aid in explanation of the auto-commissioning system based on smart sensors, i.e., in reality, the lines that form the grid may not be present on the captured image. Each box of the grid illustrated in FIG. 2 may be an example representation of a pixel in an image of the room as captured by the imaging sensor 102.

In one embodiment, the imaging sensor 102 may be configured to capture the image and transfer the image to the centralized server 116 for further processing. In another embodiment, the imaging sensor 102 may be configured to both capture and process the image rather than forwarding the image to a centralized server 116.

Processing the image may include determining a penetration or determining an influence of natural light and/or artificial light in the room. For example, the influence of light in the room may be determined by analyzing one or more characteristics of the image pixels that provide information about the light intensity in the room. For example, the darker pixels, for example pixels 204a and 204b may represent areas in the room 110 that are not well illuminated and lighter pixels i.e., pixel 206 may represent an area in the room 110 that is well light. One of ordinary skill in the art can understand and appreciate that any other appropriate methods of luminescence determination may be employed without departing from the broader scope of this description.

Further, based on the luminescence map and/or the pixel intensities, either the centralized server 116 and/or the imaging sensor 102 may determine a location of the lighting fixtures 104a and 104b with respect to the location of the imaging sensor 102. For example, the portion of the room 110 with the brightest image pixels may be associated with the location of an artificial light source. In another example, the portion of the room having pixel intensity higher than a threshold amount (user settable or modifiable based on various factors such as presence of natural light) may be associated with the location of an artificial light source. In one embodiment, the process of determining the location of the artificial light sources 104 may be performed in the absence of natural light in the room or when natural light is below a threshold level. In another embodiment, the process of locating the artificial light sources may change based on the presence and intensity of natural light.

In addition to determining the location of the artificial light sources 104 with respect to the location of the imaging sensor 102, the location of the lighting fixtures 104a and 104b may be determined with respect to the location of other devices or structures in the room, for example with respect to the location of the window 112.

Further, based on the luminescence map and/or the pixel intensities, either the centralized server 116 and/or the imaging sensor 102 may determine an area of influence 202 of the imaging sensor 102. Further, lighting fixtures, such as lighting fixture 104b may be associated with the area of influence 202. In FIG. 2, lighting fixture 104a may be outside an area of influence of the imaging sensor 102. In other words, switching on, switching off, or changing an intensity of light associated with light fixture 104a may not significantly influence an illumination within the area of influence 202. Therefore, the lighting fixture 104a may not be associated with the area of influence 202.

In addition to associating light fixtures to an area of influence, occupancy sensors may be associated with the area of influence to control the illumination of the area of influence when the presence of an occupant 130 is detected.

Further, the imaging sensor 102 can associate control devices, such as wall switches, dimmers, etc., with the respective light fixtures that are controllable by the control devices. For example, if a switch is actuated and it turns off a set of light fixtures, the imagine sensor 102 can note which light fixtures are currently controlled or assigned to that switch.

In one embodiment, the area of influence 202 may dynamically change based on the various factors, for example time of day, number of occupants, intensity of natural light, etc. Further, the area of influence 202 may dynamically change based on a size of the room and the number of imaging sensors 102 in the room 110. Accordingly, the associations of the light fixtures and occupancy sensors may be reconfigured. A method of operation of the auto-commissioning system may be described in greater detail below in association with FIG. 3.

Although specific operations are disclosed in the flowcharts illustrated in FIG. 3, such operations are examples. That is, embodiments of the present invention are well suited to performing various other operations or variations of the operations recited in the flowcharts. It is appreciated that the operations in the flowcharts illustrated in FIG. 3 may be performed in an order different than presented, and that not all of the operations in the flowcharts may be performed.

All, or a portion of, the embodiments described by the flowcharts illustrated in FIG. 3 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described below.

Turning to FIGS. 3A and 3B (collectively 'FIG. 3'), these figures illustrate a process flow diagram of a method of auto-commissioning based on smart sensors, according to certain example embodiments of the present disclosure. The example method of FIG. 3 begins with operation 302 and proceeds to operation 304.

In operation 304, the light fixtures 104 in a room 110 may be switched off. Further, the window 112 of the room 110 may be set such that a maximum amount of natural light enters the room through the window 112. For example, the blinds covering the window may be pulled up or opened to let light into the room. In other words, in operation 304 the room 110 may be configured to allow the maximum amount of natural light into the room with minimal or no illumination from artificial light sources. Once the room is configured as described above, in operation 304, imaging sensor 102 may capture an image of the room 110. A processor associated with the imaging sensor 102 may determine the penetration of natural light in the room 110, when minimal or no artificial light is illuminating the room. In addition, in operation 304, the imaging sensor 102 may be configured to determine the penetration of natural light in the room 110 under different settings. For example, the blinds may be partially opened. In another example, the blinds may be fully closed to simulate a night time environment in the room 110.

In another embodiment, instead of switching off all the light fixtures 104 at one time, the light fixtures 104 may be switched off systematically to determine the penetration of natural light in specific areas of the room 110. For example, referring to FIG. 2, lighting fixture 104a may be switched off while light fixture 104b stays on to specifically determine the penetration of natural light in an area surrounding the light fixture 104a of the room 110.

Once the penetration of natural light into the room 110 under different settings is determined, in operation 306, the imaging sensor 102 is configured to determine the location of each lighting fixture 104 in the room 110 with respect to the location of the imaging sensor 102 and/or the window 112. In one embodiment, the imaging sensor 102 may determine the location of the lighting fixtures by capturing an image of the room 110 with the artificial lights turned on. Further, the imaging sensor 102 may process the image to determine the location of the artificial lights that are turned on based on the intensity of light in the pixels in the image as described above in FIG. 2.

In one embodiment, during operation 306, the room 110 may be set such that minimal or no natural light enters the room. In another embodiment, during operation 306, the room may be set such that natural light may enter the room while the lighting fixtures are turned on. Further, the lighting fixtures 104 may be turned on systematically or all at once.

After determining the location of each lighting fixture 104 in the room 110, in operation 308, the imaging sensor 102 may determine the penetration of the artificial light from each artificial light source associated with the light fixtures 104. In one embodiment, the penetration of the artificial light in the room 110 may be determined in the presence of natural light. In another embodiment, the penetration of artificial light may be determined in the absence of natural light. Either way, in operation 308, the imaging sensor 102 may determine luminescence within the room 110 or within various portions of the room 110 for different ratios of natural light to artificial light. Further, the luminescence in a room 110 may be determined for various settings that range from no natural light to maximum natural light, individually or in combination with a range of intensities of artificial light obtained from systematically turning on lighting fixtures and/or varying the intensities of the artificial light (e.g., dimming).

Once the location of lighting fixtures and the luminescence of a room 110 are determined, in operation 310, the imaging sensor 102 may be configured to determine an area of influence of the imaging sensor 102. An area of the room 110 may be allocated as an area of influence 202 associated with the imaging sensor 102 if controlling lighting fixture 104b within the area of influence 202 can change the illumination of the room by a threshold amount, for example 2 lumens.

In one embodiment, the imaging sensor 102 can systematically switch off or switch on the artificial light sources 104 to determine a change in luminescence of the room 110. For each artificial light source that is switched on or off, the image sensor 102 captures an image of the room. Further, the image sensor 102 determines if the switching on or off of the artificial light source has resulted in a threshold change in luminescence in the room.

In one example embodiment, initially an area of influence will be set as a coverage area or pattern of the imaging sensor 102. The initial area of influence can be a wide area of square footage that may include standard and/or non-standard geometries. For example, if an imaging sensor is located in the corner of a warehouse that has a non-standard geometric shape and the imaging sensor can capture an image of the entire warehouse, initially, the area of influence will be set as the entire area of the warehouse that has a non-standard geometric shape. However, if the imagining sensor can only capture an image of half the area of the warehouse, then, half the area is initially set as the area of influence. That is, initially, the area of influence is set based on an image capture range of the imaging sensor 102.

Once the initial area of influence is set, the imaging sensor 102 captures an image of the initial area of influence. Each pixel or the intensity of each pixel of the captured image may correspond or may be associated with a luminescence value measured in footcandles or other units as are known to those in the field. The imaging sensor 102 can process the captured image of the initial area of influence to determine a luminescence at each portion of the area of influence represented by the pixel corresponding to the respective portion of area of influence.

Once the image of the initial area of influence is captured, the imaging sensor controls each artificial light source in the warehouse to switch on or switch off the artificial light source. Each artificial light source may be controlled systematically or randomly. For example, if there are 10 artificial light sources in the warehouse (initial area of influence); the imaging sensor 102 may cause all the light sources to be switched off initially. Then, the imaging sensor 102 may switch on each light source one at a time to study the influence of the respective light source on a luminescence within the initial area of influence. In an alternative embodiment, the imaging sensor 102 can switch on or switch off a group of artificial light sources instead of one light source at a time. For each light source and/or group of light sources that are switched on or switched off, the imaging sensor 102 captures an image of the initial area of influence. The image is further processed to determine if the operation of the respective light source causes a threshold change in luminescence in the initial area of influence. If an operation of the light source does not create a threshold change in luminescence, then, the respective light source is removed from the area of influence. The process is repeated for each light source, and light sources may be added or removed from the area of influence.

Finally, in some embodiments, the initial area of influence may be reduced to an area that includes light sources which when controlled by the imaging sensor 102 causes at least a threshold change in luminescence. Areas associated with light sources which when controlled by the imaging sensor 102 fail to cause at least a threshold change in luminescence may be removed from the initial area of influence to obtain a final area of influence. For example, suppose the light source that is farthest away from the imaging sensor 102 is switched on and said operation does not effect a threshold change in luminescence, the respective light source that is farthest away from the imaging sensor 102 may be removed from the area of influence.

In another example embodiment, an initial area of influence may not be pre-set. Rather, the area of influence may be determined dynamically. For example, the imaging sensor 102 may systematically switch on lights in a room and determine if the light source influence a threshold change in luminescence. Assume that there are 10 artificial light sources in a room. The imaging sensor 102 begins by switching on light source 1 in the room and if light source 1 influences at least a threshold change in luminescence in the room, then light source 1 and the area associated with light source 1 is set as the area of influence. The process is repeated for each light source and area of influence is expanded as more light sources that influence at least a threshold change in luminescence in the room are identified.

After determining the area of influence 202, in operation 312 the imaging sensor 102 may be configured to associate occupancy sensors to the area of influence 202. In one embodiment, the imaging sensor 102 may be configured to detect the presence of an occupant 130 in a room 110. Upon detecting an occupant 130 and if the occupant 130 is within an area of influence of the imaging sensor 202, then the imaging sensor 102 may cause a lighting fixture to switch on. In one embodiment, the imaging sensor 102 may directly access a control system 120 that controls the operation of the lighting fixtures 104. In another embodiment, the imaging sensor 102 may transmit images to a centralized server 116 and the centralized server 116 may be configured to perform the above mentioned operations. Further, the centralized server 116 may access the control system 120 to turn on the lighting fixture upon receiving a signal from the imaging sensor 102 that is representative of detection of an occupant 130.

In addition to automatically determining an area of influence 202 by the imaging sensor 102, in operation 314, other areas of influence may be manually assigned. Further, in operation 314, the area of influence 202 that is automatically assigned by the imaging sensor in operation 310 may be manually verified. In one embodiment, the manual allocation and/or verification of the area of influence can be performed by setting the imaging sensor 102 in a programming mode, spanning the perimeter of an area of influence, recording the spanned perimeter, and setting the area of influence. For example, the technician may set the imaging sensor 102 in a programming mode and a technician may walk the perimeter of an area that the technician wishes to assign as the area of influence. The imaging sensor 102 may detect a motion of the technician and accordingly record the area that the technician walked. Further, the area walked by the technician may be registered as an area of influence.

In another embodiment, the manual allocation and/or verification of the area of influence can be performed by utilizing software to view an area through the imaging sensor and digitally drawing the area of influence. For example, the smart phone associated with a technician may be configured to receive feeds from the imaging sensor 102 and display images of the room as seen by the imaging sensor 102. Further, the technician may digitally draw an area of influence 202 and the digitally drawn area of influence may be registered as the area of influence associated with the imaging sensor 102.

Further, in one embodiment, the area of influence may be reassigned when the imaging sensor 102 determines what it thinks is the relevant area of influence by only taking control of all lights within its visual field. This could be accomplished by closing all doors in a facility, etc., such that any area that adversely affects the area of influence may be carved out of an existing area of influence 202 to generate a new area of influence for the imaging sensor 102.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the example embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A method comprising:
    determining, by an imaging sensor, an influence of natural light in an area;
    determining, by the imaging sensor, an influence of artificial light from one or more artificial light sources in the area;
    based on the influence of the artificial light and the influence of the natural light, determining, by the imaging sensor, a location of the artificial light source with respect to a location of the imaging sensor;
    allocating, by the imaging sensor, a portion of the area as an area of influence of the imaging sensor; and
    associating, by the imaging sensor, at least one artificial light source from the one or more artificial light sources to the area of influence of the imaging sensor.

2. The method of claim 1, wherein the area of influence is allocated based on a threshold change in luminescence of the area associated with one of a switching on or switching off of the one or more artificial light sources.

3. The method of claim 1, wherein the area of influence is allocated manually by:
    setting the imaging sensor to a programmable mode;
    spanning a perimeter of the portion of the area that is to be allocated as the area of influence;
    recording the spanned perimeter of the portion of the area; and
    setting the portion of the area as the area of influence.

4. The method of claim 1, further comprising associating, by the imaging sensor, at least one occupancy sensor from one or more occupancy sensors to the area of influence of the imaging sensor, wherein the at least one occupancy sensor is configured to detect the presence of an occupant in the area.

5. The method of claim 1, further comprising:
    detecting, by the imaging sensor, a presence of an occupant in the area of influence; and
    upon detecting the occupant, controlling, by the image sensor, an illumination of the area of influence where the occupant is present.

6. The method of claim 1, wherein determining at least one of the influence of natural light and artificial light in the area further comprises:
    capturing, by the imaging sensor, an image of the room;
    processing, by the imaging sensor, the image of the room to extract an intensity of one or more pixels associated with the image; and
    based on the intensity of the one or more pixels, determining a penetration of at least one of the natural light and artificial light in the area.

7. The method of claim 1, wherein the portion of the area is allocated as an area of influence if an artificial light source within the area of influence can cause a threshold change in luminescence in the area.

8. The method of claim 7, wherein controlling the illumination of the area of influence comprises: accessing, by the imaging sensor, a control mechanism associated with the at least one artificial light source to control an operation of the at least one artificial light source.

9. A system, comprising:
    an imaging sensor that includes a processor that is configured to:
        determine an influence of natural light in an area;
        determine an influence of artificial light from one or more artificial light sources in the area;
        determine a location of the artificial light source with respect to a location of the imaging sensor based on the influence of the artificial light and the influence of the natural light;
        allocate a portion of the area as an area of influence of the imaging sensor;
        associate at least one artificial light source from the one or more artificial light sources with the area of influence of the imaging sensor; and
        associate at least one occupancy sensor with the at least one artificial light source that is associated with the area of influence of the imaging sensor.

10. The system of claim 9, wherein the processor associated with the imaging sensor is configured to control a ratio of the natural light to artificial light in the area.

11. The system of claim 9, wherein the processor associated with the imaging sensor is configured to:
    detect a presence of an occupant in the area of influence; and
    upon detecting the occupant, control an illumination of the area of influence where the occupant is present.

12. The system of claim 9, wherein the area of influence of the imaging sensor is dynamically reallocated based on at least one of a time of day, a number of occupants in the area, and an intensity of natural light in the area.

13. The system of claim 9, wherein the area of influence is allocated based on a threshold change in luminescence of the area associated with one of a switching on or switching off of the one or more artificial light sources.

14. The system of claim 9, wherein the portion of the area is allocated as an area of influence if an artificial light source within the area of influence can cause a threshold change in luminescence in the area.

15. The system of claim 9, wherein to determine at least one of the influence of natural light and artificial light in the area, the processor of the imaging sensor is configured to:
    capture an image of the room;

process the image of the room to extract an intensity of one or more pixels associated with the image; and determine a penetration of at least one of the natural light and artificial light in the area based on the intensity of the one or more pixels.

16. An apparatus, comprising:

an imaging sensor; and a processor coupled to the imaging sensor and configured to:

determine an influence of natural light in an area;

determine an influence of artificial light from one or more artificial light sources in the area;

determine a location of the artificial light source with respect to a location of the imaging sensor based on the influence of the artificial light and the influence of the natural light;

allocate a portion of the area as an area of influence of the imaging sensor; and associate at least one artificial light source from the one or more artificial light sources with the area of influence of the imaging sensor.

17. The apparatus of claim 16, wherein the processor is configured to associate at least one occupancy sensor responsible for the at least one artificial light source with the area of influence of the imaging sensor.

18. The apparatus of claim 16, wherein the area of influence is allocated based on a threshold change in luminescence of the area associated with one of a switching on or switching off of the one or more artificial light sources.

19. The apparatus of claim 16, wherein the portion of the area is allocated as an area of influence if an artificial light source within the area of influence can cause a threshold change in luminescence in the area.

20. The apparatus of claim 16, wherein the area of influence is manually allocated by:

setting the imaging sensor to a programmable mode;

spanning a perimeter of the portion of the area that is to be allocated as the area of influence;

recording the spanned perimeter of the portion of the area; and setting the portion of the area as the area of influence.

\* \* \* \* \*